Aug. 25, 1959 | P. F. MARINER ET AL | 2,900,706

LENS, MIRROR OR LIKE ELEMENTS FOR HIGH FREQUENCY RADIO AERIALS

Filed Nov. 20, 1953 | 3 Sheets-Sheet 1

INVENTORS
Peter Frederick Mariner
John Alexander Christie Kinnear
BY Cameron, Kerkam & Sutton
ATTORNEYS INVENTORS
Peter Frederick Mariner
John Alexander Christie Kinnear
BY
Cameron, Kerkam & Sutton
ATTORNEYS INVENTORS
Peter Frederick Mariner
John Alexander Christie Kinnear
BY
Cameron, Kerkam & Sutton
ATTORNEYS United States Patent Office 2,900,706
Patented Aug. 25, 1959

2,900,706

LENS, MIRROR OR LIKE ELEMENTS FOR HIGH FREQUENCY RADIO AERIALS

Peter Frederick Mariner, Elstree, and John Alexander Christie Kinnear, Bromley, England, assignors to Elliott Brothers (London) Limited, London, England, a company of Great Britain Application November 20, 1953, Serial No. 393,485
Claims priority, application Great Britain November 21, 1952
3 Claims. (Cl. 29—155.5)

This invention relates to lens, mirror, or like elements for high frequency radio aerials and is concerned more particularly with elements which comprise a relatively large number of electrically conducting sheets or strips arranged side-by-side with their faces in parallel relation and uniformly spaced apart by a predetermined distance, the widths of the sheets or strips being so chosen that all the longitudinal edges thereof at one or other or each face of the element are contained in a surface having the configuration, whether flat, spherically curved or otherwise shaped, required for insuring the desired focussing, collimating or other properties of the finished assembly. In such elements, there may be a single set only of the sheets or strips, all arranged with their lengths parallel to a given axis, or there may be two such sets having the sheets or strips of the one set arranged with their faces parallel to a given plane and the sheets or strips of the other set arranged with their faces normal to that plane, the lens or other element then being of so-called "egg-box" construction.

The manufacture of elements of the character referred to involved tedious and time-consuming assembly operations requiring a high degree of accuracy, becoming as difficult for large elements in which the sheets or strips are spaced apart by several centimetres as it does for small elements in which the spacings are less than 1 cm. Consequently the finished elements are relatively costly and may, in order to have sufficient rigidity, be of considerable weight.

It is the object of the present invention, therefore, to provide an improved method of manufacturing radio-aerial elements of the character referred to above which shall be simple and rapid of execution and shall enable such elements to be produced more cheaply than has hitherto been possible and, in certain cases, with a reduction in weight.

According to this invention, a method of manufacturing radio-aerial elements of the character referred to comprises preparing a plurality of sheets, strips or rods of a solid dielectric material having a thickness between opposed faces equal to the spacing required between adjacent conducting sheets or strips in the finished element, and producing an electrically conducting surface on at least one of said faces of each sheet, strip or rod. The conducting surface, which may be either a complete covering or an area having an outline of a required shape, may be produced by adhesively securing a conducting foil of adequate thinness to the dielectric spacer, or by coating the dielectric spacer with a conducting composition, for example paint containing metallic pigment, or by chemically depositing a conducting film, or by first coating the dielectric spacers with a conducting medium and adding to the conductivity of the layer thus produced by electrolytic deposition. The coated sheets, strips or rods are adhesively secured together so that the conducting coatings, or the corresponding conducting coatings where each sheet, strip or rod carries a plurality thereof, are disposed in parallel spaced relationship.

The dielectric material is usually preferably one having a low dielectric constant and one giving low attenuation to transmission of the radio energy concerned, for example, one of the expanded plastics.

The adhesive employed in securing together the coated sheets or strips of dielectric material must naturally be one which is compatible with the conducting and spacing materials and which will produce a strong and permanent bond between the adjacent sheets, strips or rods, for example, an incompletely polymerised plastic which is to be finally polymerised in situ between the sheets or strips is especially suitable.

In order that the invention may be clearly understood, some examples of the way in which it may be carried into practical effect will now be described with reference to the accompanying drawings in which.

The examples illustrated in Figures 1 to 15 are concerned with the production of a mirror element having a paraboloidal surface to be presented to the incident energy and composed of electrically conducting strips each having one longitudinal edge contained in this surface, the strips being disposed in parallel relation in such a direction and at such a spacing that substantially the whole of the incident energy will be reflected therefrom.

Figure 1:
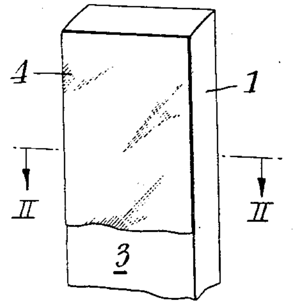
Figure 1 is a fragmentary perspective view of an elemental strip of solid dielectric material coated on one face with a conducting medium and forming part of a mirror unit.
Figure 2:
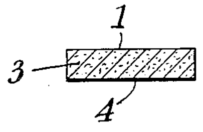
Figure 2 is a section taken on the line II—II of Figure 1.
Figure 3:
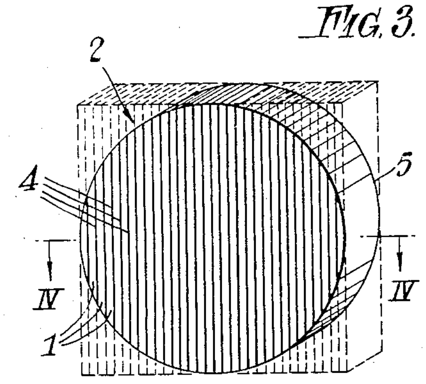
Figure 3 is a perspective view on a smaller scale of a mirror unit constructed from a plurality of elemental strips.
Figure 4:
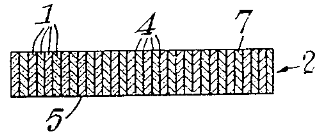
Figure 4 is a section taken on the line IV—IV of Figure 3.

In the example illustrated in Figures 1 to 5 a series of rectangular strips 1 of a solid dielectric material are prepared to a thickness equal to the desired spacing between conducting strips. The length of each strip 1 in the series is suitably selected such that when the strips 1 are placed face-to-face in a selected order they will form a substantially cylindrical body such as the unit indicated generally at 2 (Figure 3). Alternatively the length of each strip 1 may be such that when the strips are assembled they will form a solid body such as that indicated in broken lines in Fig. 3 which may be machined to the desired shape, e.g. cylindrical. One face 3 of each strip 1 is coated with a uniform layer 4 of a conducting medium, If desired both faces of the strips 1 may be coated with such a conducting layer. The strips 1 are then coated on one or both faces with an adhesive and are then stacked face-to-face with the layers 4 disposed in spaced parallel relationship and clamped together with one longitudinal edge in contact with a flat surface until the adhesive has set or been caused to set to form the unit 2 (Figure 3).

Figure 5:
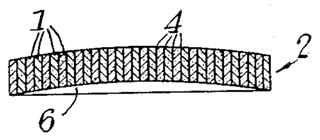
Figure 5 is a view similar to Figure 4 showing the mirror unit after both faces have been machined to a predetermined configuration.
Figure 6:
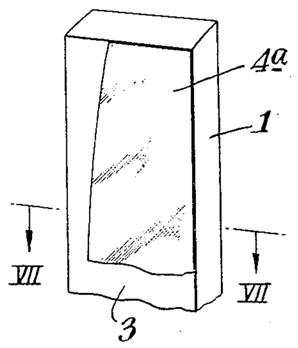
Figure 6 is a fragmentary view of an elemental strip similar to that shown in Figure 1 coated over a selected area of one face with a layer of a conductive medium.
Figure 7:
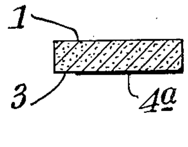
Figure 7 is a section taken on the line VII—VII of Figure 6.
Figure 8:
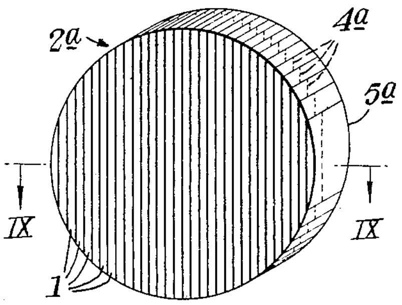
Figure 8 is a perspective view on a smaller scale of a mirror unit constructed from a plurality of elemental strips of the character illustrated in Figure 6.
Figure 9:
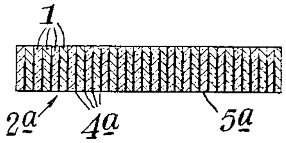
Figure 9 is a section taken on the line IX—IX of Figure 8.
Figure 15:
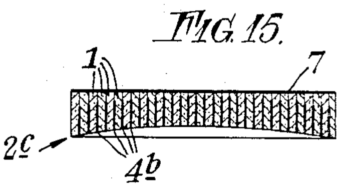
Figure 15 is a view similar to Figure 13 showing a mirror unit composed of the elemental strips of Figure 11 having on one face a conductive coating to a predetermined configuration.

In order to produce the desired paraboloidal surface the front face 5 of the unit 2 is machined to the desired configuration to provide the paraboloidal surface 6 (Figure 5). Where it is desired that the width of the conducting strips of a paraboloidal mirror should be constant throughout their length the rear face 7 of the unit 2 is machined parallel to the paraboloidal surface 6 as can be seen in Figure 15. By using machining techniques appropriate to the materials the conducting surface can be prevented from spreading to a significant extent across the machine face.

Figure 10:
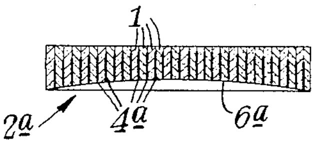
Figure 10 is a view similar to Figure 9 showing the mirror unit of Figure 8 after one face has been subjected to a machining operation.
Figure 11:
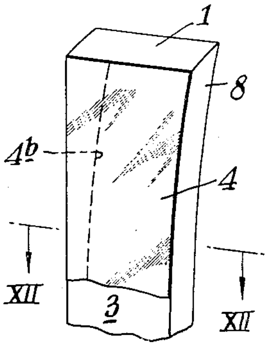
Figure 11 is a fragmentary perspective view of a form of elemental strip which is an alternative to that shown in Figure 1.
Figure 13:
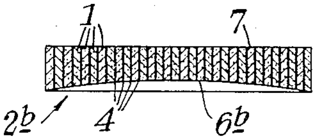
Figure 13 is a view similar to Figure 4 showing on a smaller scale the mirror unit produced from the elemental strips illustrated in Figure 11.

It will be appreciated that the width of the conducting strips provided by the conductive layers 4 on the strips 1 may be maintained constant throughout the length of the strips 1 in the finished unit by coating to a predetermined pattern the face 3 of each strip 1 with a layer 4*a* (Figures 6 and 7) of a conducting medium. This may be readily done by for example, spraying the face 3 of the strip 1 to be coated with a paint such as aluminum paint and masking that area of the face 3 which is to remain uncoated. One or both faces of the strips 1 are then coated with an adhesive and are clamped together as before to provide the substantially cylindrical unit 2*a* illustrated in Figures 8 and 9. In this case it is only necessary to machine the front face 5*a* of the unit 2*a* to the desired configuration to provide the paraboloidal surface 6*a* (Figure 10).

Figure 14:
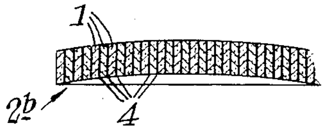
Figure 14 is a view similar to Figure 13 showing the mirror unit after one face has been machined.
Figure 12:
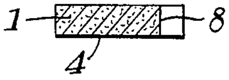
Figure 12 is a section taken on the line XII—XII of Figure 11.

In the example illustrated in Figures 11 to 14 the uncoated strips 1 of solid dielectric material have that longitudinal edge 8 which is to form part of the paraboloidal surface 6*b* of the final mirror unit, shaped to the desired configuration so that when the strips 1 have been coated and adhesively secured together in the manner described with reference to Figures 1 to 4 they will form a mirror unit 2*b* the front face 6*b* of which follows the desired paraboloidal contour. In order to maintain the width of the conductive layers 4 constant throughout their length the faces 3 of the strips 1 may be entirely covered by the layers 4 and the rear face 7 of the unit 2*b* machined parallel with the front face 6*b* (as shown in Figure 14) or the coating 4 may be applied to a selected area of the face 3 of each strip 1 to extend from the shaped longitudinal edge 8 to the dotted line 4*b* (Figure 11) which is parallel to the edge 8 so as to form a conductive coating of constant width throughout its length. Assembly of the strips 1 having only a selected area of the surfaces 3 coated as described produces a mirror unit 2*c* as shown in Figure 15 the rear face 7 of which does not require to be machined, the unit 2*c* being ready for use in the form in which it is assembled. As a further alternative the longitudinal edge opposite to the shaped edge 8 of each strip 1 may be cut parallel to the edge 8 along the line indicated by the dotted line 4*b* (Figure 11) to provide a unit which would be identical with that shown in Figure 14.

Figure 16:
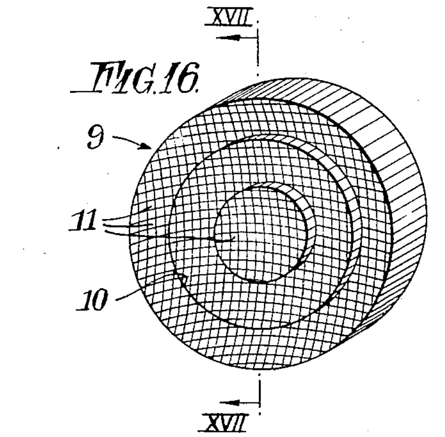
Figure 16 is a perspective view of an aerial lens unit of "egg-box" construction.
Figure 17:
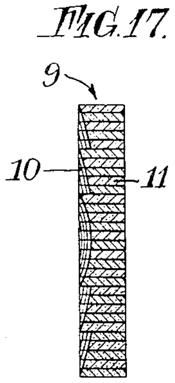
Figure 17 is a section taken on the lines XVII—XVII of Figure 16.
Figure 18:
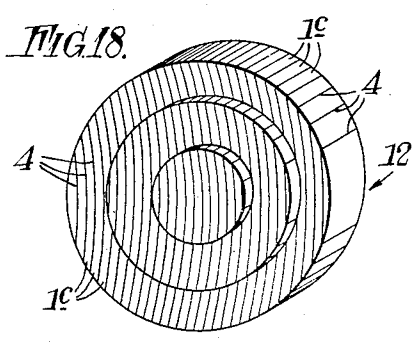
Figure 18 is a perspective view of the lens unit of Figure 16 at an intermediate stage in its manufacture.
Figure 19:
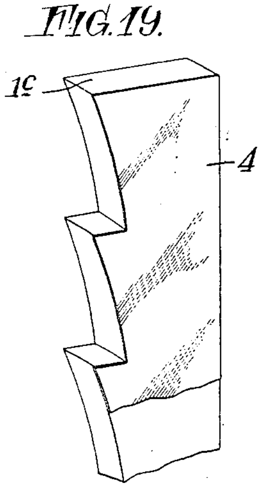
Figure 19 is a fragmentary perspective view on an enlarged scale of an elemental strip which may be used in the manufacture of the unit shown in Figure 18.

Another example relates to a lens unit of "egg-box" construction such as that shown at 9 in Figures 16 and 17 in which the front face 10 has a predetermined stepped configuration and in which the unit may be considered to be made up of a series of tubes 11 of square cross-section, the tubes being formed from a dielectric material and the surfaces of the tubes being coated with a layer of conducting material. Such a lens unit 9 may be constructed in accordance with the present invention by first constructing a blank such as the cylindrical body 2 of Figure 3 from strips 1 (Figure 1) coated and assembled as described with reference to Figures 1 to 3. The front face 5 of the blank 2 is then machined to the desired stepped configuration to provide the desired face 10 (Figures 16, 17 and 18) and this produces a unit of the character indicated at 12 (Figure 18). This unit 12 may alternatively be produced from a series of strips such as that shown at 1*c* (Figure 19) in which one longitudinal edge of the strip is shaped to the desired configuration and one or both faces of the strip 1 is or are coated with a layer 4 of a conducting medium, and which are the strips 1 then being adhesively secured together and assembled as previously described to form the unit 12.

Figure 20:
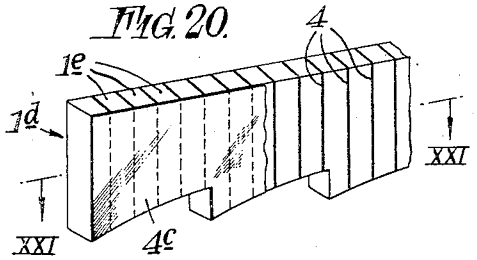
Figure 20 is a fragmentary perspective view on an enlarged scale of an elemental composite strip produced by slicing the unit shown in Figure 18 along parallel planes which are normal to the faces of the elemental strips and to the longitudinal edges of such strips.

The unit 12 is sliced into composite strips of which a part of one is shown at 1*d* (Figure 20) by cutting the unit 12 in planes normal to both the longitudinal edges and the coated faces of the strips 1*c* of dielectric material, the composite strips 1*d* thus obtained being of a width equal to that of the strips 1*c* but being composed of square section rods 1*e* of the dielectric medium which are separated from each other by layers 4 of the conducting medium.

Figure 21:
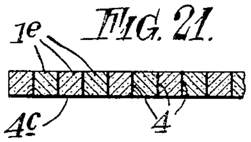
Figure 21 is a section taken on the line XXI—XXI of Figure 20.

The composite strips 1*d* are coated with a layer 4*c* (Figures 20 and 21) of a conducting medium on one or both faces and are then cemented together in the same relative positions they occupied in the unit 12 before the slicing thereof to provide the lens unit 9 (Figures 16 and 17) in which the tubes 11 (which are constituted by the rods 1*e* and the coatings 4 and 4*c*) have their axes parallel to the axis of the lens unit 9. If it is desired that the axes of the tubes 11 should be inclined to the axis of the lens unit 9 then the unit 12 (Figure 18) would be sliced in a direction normal to the coated faces of the strips 1*c* and inclined at the desired angle to the longitudinal edges thereof.

It will be understood that the amount of material removed as dust or swarf during the slicing or cutting operations may be such that the width of the cut is equivalent to the combined thicknesses of the coatings of conducting medium and adhesive later applied to the cut faces. This is not essential, however, because the shaping of the unit 12 may be such that allowance is made initially for these factors and the finished lens element 9 will have the required surface configurations. Alternatively, the lens element 9 may have its surfaces trued after the assembly of its parts.

It should be noted that it is not a disadvantage if the transversely extending metallic layers 4 and 4$c$ in one composite strip 1$d$ do not register exactly with the corresponding layers in the next-adjacent composite strips. Consequently, such composite strips 1$d$ may be produced to given cross-sectional dimensions and assembled in the manner described without being arranged in any precise order, the shaping of the exposed faces of the assembled elements being effected entirely by machining operations.

Figure 22:
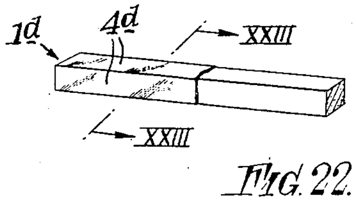
Figure 22 is a fragmentary perspective view of an elemental rod of dielectric material of square cross-section which may be used to manufacture a lens unit similar to that shown in Figure 16.
Figure 23:
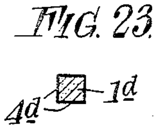
Figure 23 is a section taken on the line XXIII—XXIII of Figure 22.

In another example of the production of a lens unit of the "egg-box" construction indicated at 9 (Figures 16 and 17), there are first prepared strips 1$d$ (Figures 22 and 23) of dielectric material having a square cross-section the length of the side of which is equal to the spacing required between conducting layers in the finished lens unit 9. These strips 1$d$ are coated with a layer 4$d$ of a conducting medium on all four longitudinal faces and cut into appropriate lengths which are then cemented together with their conducting faces in contact. If the lengths of the strips 1$d$ are not initially cut to exact dimensions, the faces of the lens unit 9 produced may be machined to the required configuration.

It will be understood that the layers of conducting material formed on the strips of insulating material may be applied in any suitable manner, e.g. by spraying with a paint containing a metallic pigment or by chemical deposition of a conducting film. The dielectric material may be any suitable material, e.g. expanded or foamed polyvinyl chloride or polystyrene, such that it provides a mechanical support for the conducting surfaces.

It will be appreciated that the dielectric material is selected to suit the electrical properties of the type of aerial element to be constructed, and in some cases replaces the air-space between the conducting sheets or strips of known construction without any substantial change in the electrical properties thereof.

What we claim is:

1. A method of manufacturing a lens element for high frequency electromagnetic energy which comprises preparing a plurality of elemental units of solid dielectric material having a predetermined thickness between opposed faces, producing an electrically conducting surface on at least one of said faces of each unit, assembling and securing the units together in a predetermined relationship to produce a blank in which the electrically conducting surfaces are disposed in parallel relationship and spaced apart by said predetermined thickness of dielectric material, slicing the blank in planes normal to said conducting surfaces to produce a plurality of secondary elemental units having a thickness between opposed faces substantially equal to said predetermined thickness, producing an electrically conducting coating on at least one of said faces of each secondary elemental unit and assembling and securing the secondary elemental units together in the same relative positions as those occupied prior to slicing of the blank to reconstitute the blank.

2. A method according to claim 1 wherein the elemental units are strips of solid dielectric material and which includes the step of initially shaping one longitudinal edge of each strip to a predetermined configuration such that in the reconstituted blank one longitudinal edge of the conducting surface produced on each strip and one longitudinal edge of the conducting surface produced on each secondary elemental strip are contained in a surface having a predetermined configuration.

3. A method according to claim 1 which includes the step of machining to a predetermined configuration at least one of the faces of the reconstituted blank which is normal to the electrically conducting surfaces formed on each elemental strip.

References Cited in the file of this patent

UNITED STATES PATENTS

| | | |
|---|---|---|
| 1,476,048 | Bucky | Dec. 4, 1923 |
| 1,682,364 | Ballantine | Aug. 28, 1928 |
| 1,785,479 | Dubilier | Dec. 16, 1930 |
| 1,890,335 | Nodine | Dec. 6, 1932 |
| 1,892,755 | Scheppman | Jan. 3, 1933 |
| 2,014,399 | Sprague | Sept. 17, 1935 |
| 2,280,981 | Schuh | Apr. 28, 1942 |
| 2,437,212 | Schottland | Mar. 2, 1948 |
| 2,509,909 | Davis | May 30, 1950 |
| 2,577,619 | Kock | Dec. 4, 1951 |
| 2,607,009 | Affel | Aug. 12, 1952 |
| 2,643,336 | Valensi | June 23, 1953 |
| 2,654,060 | Stovall | Sept. 29, 1953 |
| 2,673,792 | Gulton | Mar. 30, 1954 |
| 2,728,693 | Cado | Dec. 27, 1955 |
| 2,761,141 | Strandberg | Aug. 28, 1956 |